(No Model.)

C. T. MASON, Jr.

METHOD OF MAKING COTTON PICKER STEMS.

No. 345,312. Patented July 13, 1886.

WITNESSES
Gustave Dieterich
Fred Huetwohl

INVENTOR
Charles T. Mason Jr
by Park Benjamin
Attorney

UNITED STATES PATENT OFFICE.

CHARLES T. MASON, JR., OF SUMTER, SOUTH CAROLINA, ASSIGNOR TO THE MASON COTTON HARVESTER COMPANY.

METHOD OF MAKING COTTON-PICKER STEMS.

SPECIFICATION forming part of Letters Patent No. 345,312, dated July 13, 1886.

Application filed October 31, 1885. Serial No. 181,466. (No model.)

*To all whom it may concern:*

Be it known that I, CHARLES T. MASON, Jr., of Sumter, Sumter county, South Carolina, have invented a new and useful Improvement in Processes of Manufacture of Cotton-Picking Stems, of which the following is a specification.

Figure 1:
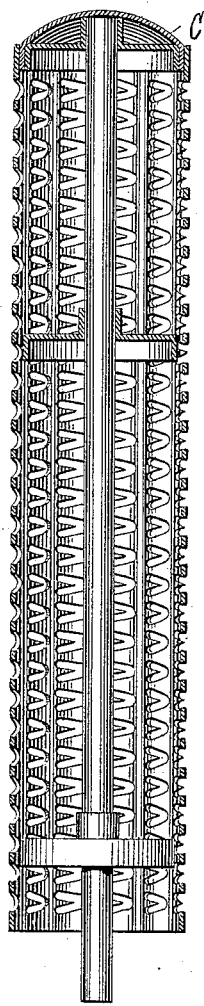
Figure 2:
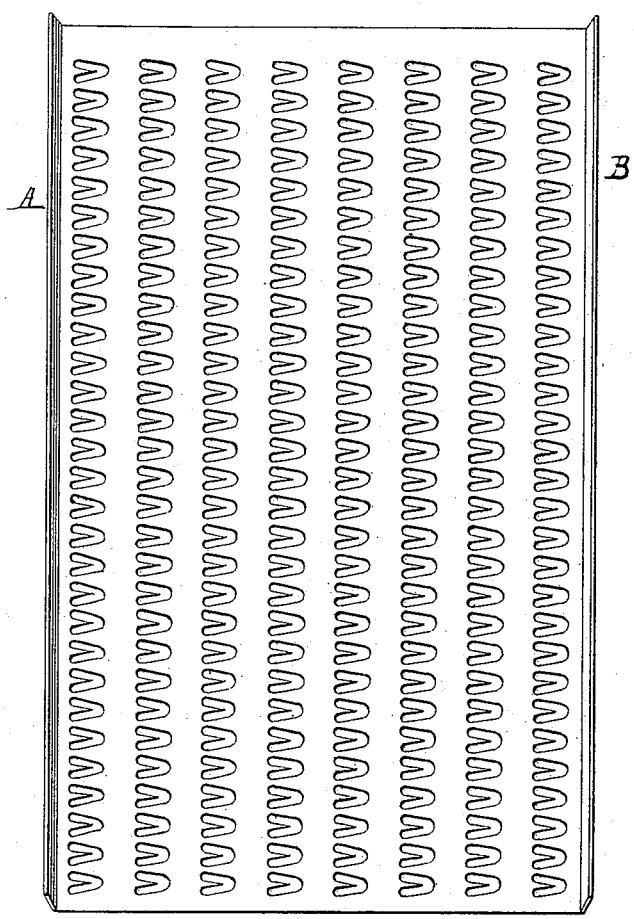
Figure 3:
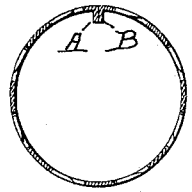
Figure 4:
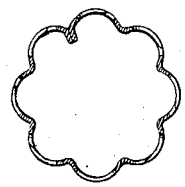

In the accompanying drawings, Figure 1 is an elevation of my improved stem, exhibiting also details of construction. Fig. 2 shows the metal envelope with its edges turned up. Figs. 3 and 4 show said envelope with its edges approximated.

Similar letters of reference indicate like parts.

My invention relates to a new process for the manufacture of cotton-picking stems, substantially of the form and construction shown in Fig. 1 of the accompanying drawings. Such a stem is used by me in a cotton-harvesting machine, and is therein suitably operated to gather cotton from the plants.

My process of manufacture is as follows: I first produce in a sheet of metal, by punching or cutting, a series of V-shaped apertures or slots, each containing a pointed tooth. This is done on the flat sheet, which may afterward be divided into pieces, each of suitable size to form the periphery of a stem; or I may first cut the sheet into pieces of suitable size and then form the teeth and slots therein.

I next turn up the opposite edges, A B, of said sheet, as shown in Fig. 2, and then approximate said edges, as shown in Fig. 3, bending the sheet into cylindrical form. The edges A B are united, so that the stem now has the form of a hollow cylinder with a uniformly-circular periphery. I may use the stem in this shape, but I prefer to corrugate or flute it longitudinally. This I accomplish, preferably, by placing the stem upon a fluted mandrel, which may be intermittently turned over an arc equal to the width of one flute. The said mandrel may turn beneath a vertically-reciprocating concave die, which in descending, and in conjunction with the supporting-mandrel, forms each flute successively upon the cylinder.

I do not claim this apparatus for the purpose herein, inasmuch as I intend to make the same the subject of another application for Letters Patent hereafter to be filed, of which intention notice is hereby given; neither do I limit myself to the use of the aforesaid apparatus in carrying out my herein-described process, inasmuch as I may employ other means.

After the corrugating operation is completed the picking-teeth are set so that the points are uniformly disposed at the level of the adjacent portions of the cylinder-periphery. This I may do by a vertically-reciprocating die of suitable form.

With the cutting process which I generally employ for making the teeth, they are formed at once properly sharpened; but as said teeth may be produced by other means, they may, after the above operations are concluded, not be sufficiently sharp properly to engage the cotton. In such event the next step is the sharpening of the teeth, which I prefer to do by placing the cylinder upon a suitable mandrel or other support, and bringing it in contact with, or moving into contact with it an emery-wheel, file, or grindstone.

Lastly, the completed stem-cylinder is mounted in any suitable way for attachment to or in the machine—as, for example, in the manner shown in Fig. 1, in which the cylinder is supported on flanged disks secured to a central rod. At the end of the cylinder it is preferable to apply a convex cap, C.

The specific construction of stem shown in Fig. 1 I do not herein claim, inasmuch as the same is fully described and claimed in another application for Letters Patent, Serial No. 181,465, filed simultaneously herewith.

I claim—

1. The process of making sheet-metal cylinders containing openings and teeth therein, which consists in, first, forming V-shaped slots with teeth therein in a flat metal sheet; second, bending said sheet in cylindrical form and uniting the opposite edges; third, adjusting or placing the points of said teeth at the level of the adjacent portions of the cylinder-periphery, substantially as described.

2. The process of making cotton-picker stems, substantially as herein set forth, which consists in, first, forming V-shaped slots with teeth therein in a flat metal sheet; second, turning up opposite edges of said sheet; third, bending said sheet in cylindrical form and uniting said turned-over edges; fourth, longitudinally corrugating or fluting said cylinder; fifth, adjusting the points of the teeth to lie at the level of the adjacent portions of the cylinder-periphery.

3. The process of making cotton-picker stems, substantially as herein set forth, which consists in, first, forming V-shaped slots with teeth therein in a flat metal sheet; second, turning up opposite edges of said sheet; third, bending said sheet in cylindrical form and uniting said turned edges; fourth, longitudinally corrugating or fluting said cylinder; fifth, adjusting the points of the teeth to lie at the level of the adjacent portions of the cylinder-periphery; sixth, sharpening the points of the teeth.

CHARLES T. MASON, JR.

Witnesses:
F. F. MORTIMER,
GEO. B. BEALE.